(12) United States Patent
Nijman et al.

(10) Patent No.: US 6,703,934 B1
(45) Date of Patent: Mar. 9, 2004

(54) METHOD FOR DYNAMIC PRICING OF GOODS AND SERVICES

(75) Inventors: Loek Nijman, Riethoven (NL); Carolyn Ramsey Catan, Pleasantville, NY (US); Michael E. Marion, Mahopac, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/603,874

(22) Filed: Jun. 26, 2000

Related U.S. Application Data

(60) Provisional application No. 60/196,518, filed on Apr. 11, 2000.

(51) Int. Cl.[7] .............................................. G08B 13/14
(52) U.S. Cl. ................................. 340/572.1; 235/383
(58) Field of Search ............................. 340/572.1, 551, 340/825.35; 705/16, 20, 26; 235/377, 383, 378

(56) References Cited

U.S. PATENT DOCUMENTS

| | | | | | |
|---|---|---|---|---|---|
| 4,002,886 | A | * | 1/1977 | Sundelin | ................ 235/61.7 R |
| 4,888,709 | A | * | 12/1989 | Revesz et al. | ......... 340/825.07 |
| 5,151,684 | A | * | 9/1992 | Johnsen | .................... 340/572.1 |
| 5,172,314 | A | * | 12/1992 | Poland et al. | ................ 235/383 |
| 5,797,131 | A | * | 8/1998 | Goodwin, III et al. | ....... 705/16 |
| 5,870,714 | A | * | 2/1999 | Shetty et al. | ................. 705/20 |
| 5,873,069 | A | * | 2/1999 | Reuhl et al. | ................ 235/375 |
| 5,963,133 | A | | 10/1999 | Monjo | ..................... 340/572.1 |
| 5,988,498 | A | * | 11/1999 | Hoell | .......................... 235/383 |

* cited by examiner

*Primary Examiner*—John A Tweel, Jr.

(57) ABSTRACT

A method and apparatus for pricing items, such as goods or services, which features the use of price tags having customer readable displays which can be controlled via a central processor or computer in response to monitored environmental conditions

11 Claims, 3 Drawing Sheets

METHOD FOR DYNAMIC PRICING OF GOODS AND SERVICES

This application claims the benefit of U.S. Provisional Application 60/196,518, filed Apr. 11, 2000.

BACKGROUND OF THE INVENTION

Retail businesses are facing increased competition from the new internet and other "on-line" businesses. Although conventional "walk-in" retail shops provide the customer with clear advantages over "on-line" shopping, such as the ability to view merchandise before buying and "over the counter" delivery, the "on-line" businesses can be much more competitive in price since an on-line business merely has to change the selling price of a good or service offered on its web site.

The typical retail shop displays hundreds of items. The selling price of each item is indicated, in most cases, on a price tag attached to the item or a sign placed near to the item. Price is indicated in customer readable form, e.g. as a written or printed price tag. The price is often indicated in machine readable form as well, for example as a bar code.

The bar code price indication is machine read at the check-out counter and cross referenced to a computer record indicates its current price. Although the bar code indication of price can be quickly changed by altering the item's computer record, the customer readable price indication cannot be easily altered since it is typically printed on each individual price tag and must be altered one at a time.

U.S. Pat. No. 5,963,133, which is incorporated by reference herein, describes an electronic price tag for indicating the price of an item in customer readable form, which can be altered from a central computer to which it is electronically coupled. This patent provides a way to quickly change the price of an item without having to remove old price tags and replace them with new ones each time a price change is desired.

SUMMARY OF THE INVENTION

The instant invention teaches an application which can utilize an electronic tag similar to the one described in '133, as part of a method of doing business and system which can provide a retail shop with the pricing flexibility necessary to effectively compete with on-line businesses and other "e-commerce" innovations. The invention provides a method and apparatus for measuring various types of environmental conditions relevant to the business and the prices charges, for example the number of customers entering the shop in a given time interval, the time of day, the date, special sales events and the prices charged by competing businesses.

DETAILED DESCRIPTION OF THE INVENTION

Businesses which sell items and services on-line over the internet or over the telephone, can change the offering price for goods and services on a moment's notice. The change can be in response to customer bids, or in response to the prices charged by other on-line competitors.

Web sites are now appearing which encourage comparison shopping by listing the prices charged by numerous on-line vendors for a wide variety of merchandise. The obvious effect is to allow the user to "browse" for the lowest price. Competitors can also use the site to discover what everyone else is charging for an item. By keeping track of the prices charged by its competitors an online business can decide to "meet or beat" the posted price and such changes in price can be implemented immediately by changing the posted price. One goal of the instant invention is to provide the same degree of pricing flexibility to the traditional retail shop.

The invention can help manage peak flow problems experienced by the retail shop. By raising prices when the shop is at its busiest, the shop can afford more staff during rush hours. Similarly, when business is slow, the price can be lowered to stimulate increased purchases by those customers who have entered the shop. Shoppers might also be encourage to spread out their shopping schedule to take advantage of lower prices.

A preferred embodiment of the invention comprises a system and method which detects various external or environmental activities and conditions and, depending on the occurrence of one or combination of such activities and conditions, can automatically institute a pre-programmed change in the price of an item and its indication on the electronic tag. This embodiment is exemplified by the following example which is illustrated in FIGS. 1 and 2.

If the price of an item is initially set at $300.00, for example, the shop can use a number of electronically controlled price tags 10 connected to, or adjacent to each item. The price can be set by a central processor 15, eliminating the need to change individually, the price indicated on each tag.

Figure 1:
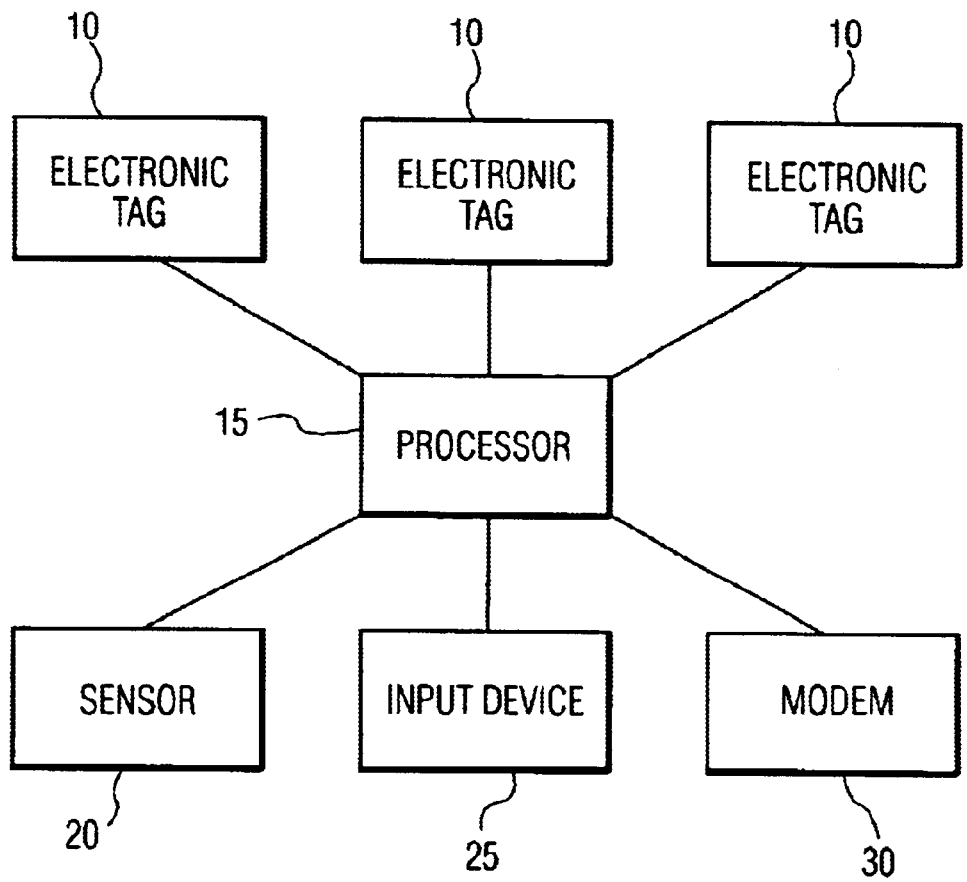
FIG. 1 is a block diagram describing the apparatus of the invention.
Figure 2:
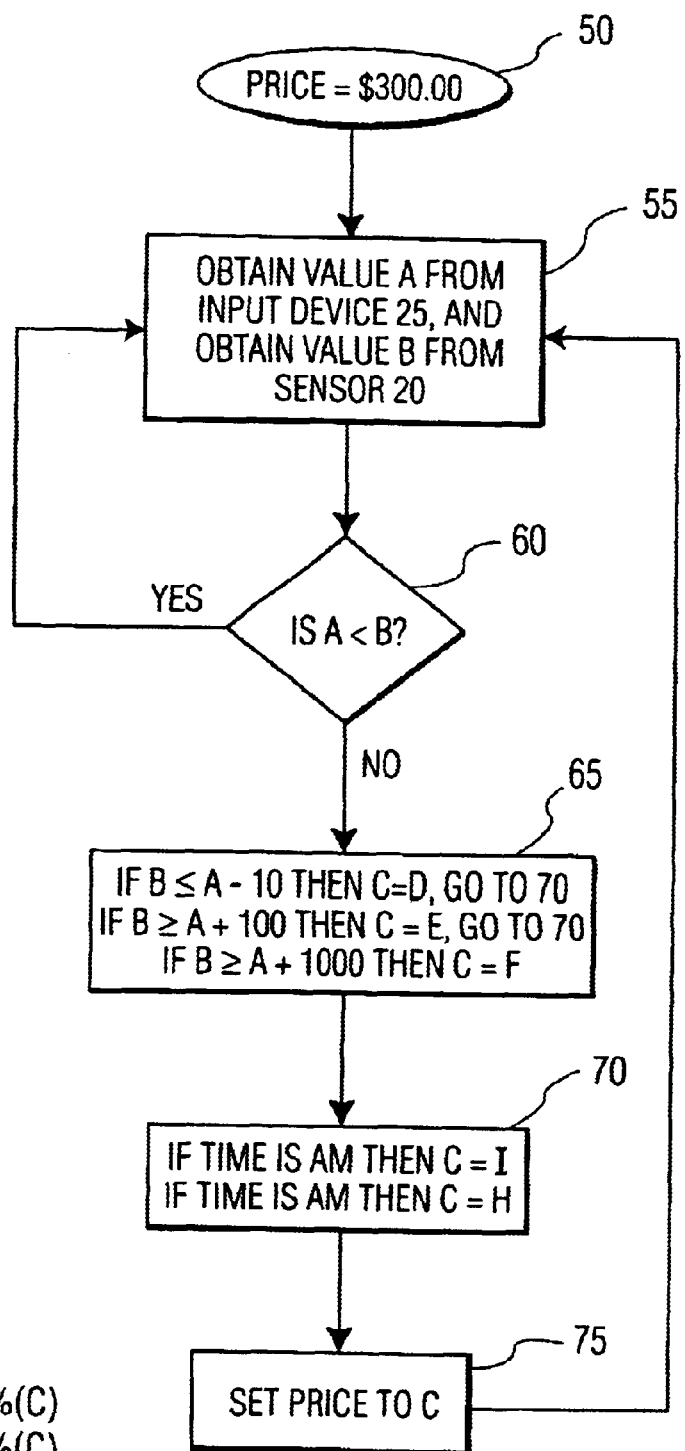
FIG. 2 is a flow chart describing the method of the invention.

The invention comprises a system as shown for example, in FIG. 1 which includes a plurality of electronic price tags 10 coupled electronically to central processor 15. Ideally the tags 10 will be coupled to the processor 15 via a wireless data transmission system. Such coupling techniques include, for example, RF, optical, and other passive or active transmission techniques which are known in the art and are suitable for use with the respective type of electronic tag display being used. Of course, where suitable, hard wired coupling of the tags 10 to the processor 15 can also be used.

In this example, we assume that the electronic tag 10 can be the type of tag described in the '133 patent, however other display technologies known in the art can also be utilized, such as those which take advantage of polymer and paper electronics.

Coupled to the processor 15 is at least one input device 25. In a basic system the input device 25 would be a keyboard entry system by which the user could set an initial price for display on each electronic tag 10. The processor 15, responsive to the user's keyboard input, would transmit the necessary codes to each of the display circuits incorporated in respective electronic tags 10 and cause the initial price to be displayed, for example $300.00.

A modem 30 could also be coupled to processor 15 which could provide the processor 15 with price change commands issued via the telephone or other communications network, from a remote location. The modem 30 could also be connected to the internet and, under the control of programmed instructions provided by the processor 15, be directed to access the web pages of "on-line" competitors.

Figure 3:
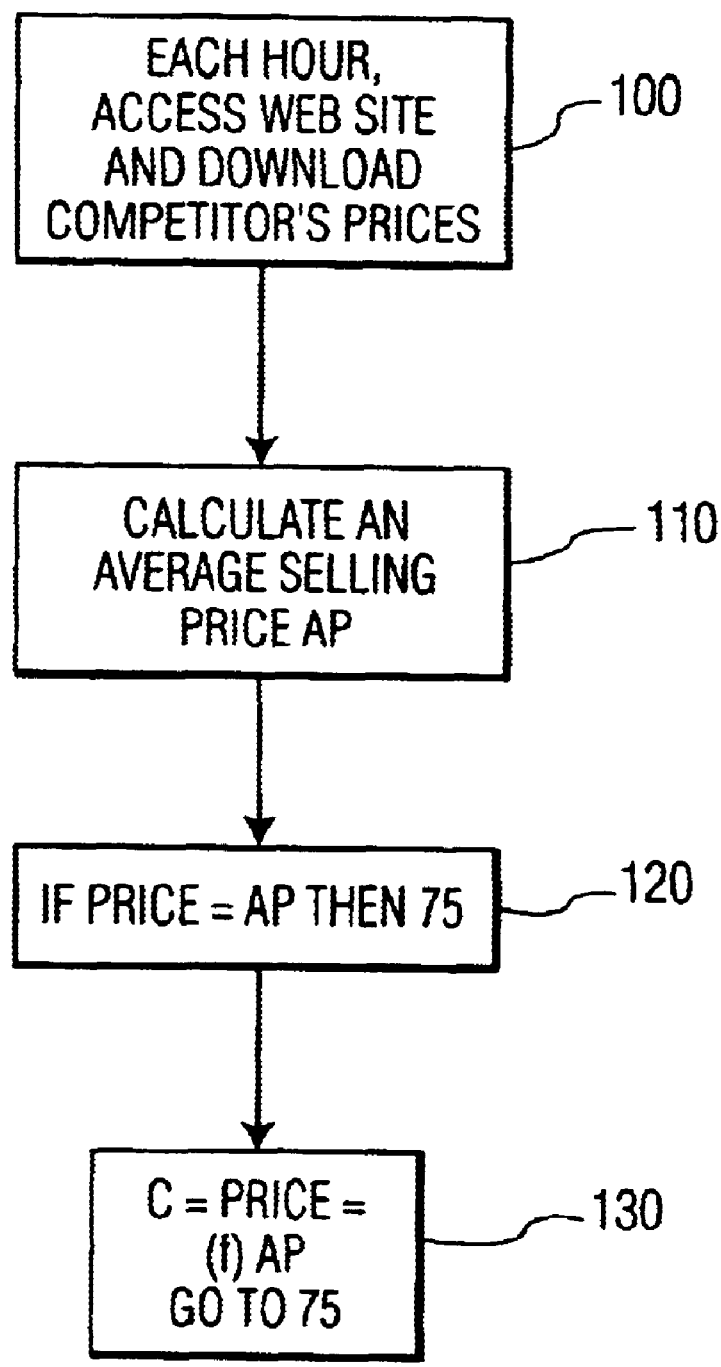
FIG. 3 is a flow chart describing a second embodiment of the invention.

Using the algorithm described in the flowchart shown in FIG. 3 the processor 15 can cause the modem 30 to access a sequence of web pages, download selected prices for selected goods from these web pages, and based upon test conditions set by the user, alter the price which is initially displayed on all or some of the electronic tags 10.

One or more sensors 20 are also coupled to the processor 15. Such sensors can be devices which detect the number of people entering the shop for example. Other sensors can detect the temperature and weather outside the shop, or the arrival of nearby mass transit vehicles. These sensors would then send signals to the processor 15 could be compared to pre-set limits and cause the processor 15 to raise or lower the prices displayed accordingly.

As described in the flowchart of FIG. 2 for example, under otherwise 'nominal' shopping conditions the displayed Price would read $300.00. This could be set by the user via input device 25 [50]. An initial reference value A corresponding to the displayed Price I could be entered into memory in the processor 15 by the user via input device 25 or modem 30 [55]. One type of sensor 20 for example, could be a counter which counts the number of people entering the shop over a set period of time (e.g. per hour). Sensor 20 sends this actual value B to the processor 15 where it is compared to value A [60]. A preprogrammed table stored in memory in the processor 15 uses the results of the comparison to determine a price increase factor D, B or F, use the factor to computer a new Price C which is then transmitted to the electronic tags 10 [75]. Not only is the customer readable Price changed, but if the display on the electronic tags 10 also provide a bar code indication, this code display could also be changed by changing its computer record in processor 15 to reflect the new Price.

As shown in step 65, if the number of people entering the shop, value B, was less than or equal to the initial reference value A minus 10, the displayed price C would be subjected to a 25% discount to stimulate purchases by customers visiting the shop when the shop is not busy. If the number of people B increases to A+100, the displayed price C would be increased by 10% reflecting a slightly higher price to compensate for higher traffic. If B increased to a A+1 000 however, the displayed price C is decreased by 5%, acknowledging the benefit of volume.

Additional environmental factors can be analyzed in accordance with the invention. For example, additional sensors can be used to determine the weather outside the shop. The determination that it is raining might be used to place rain ware or umbrellas on sale. The processor's internal clock can be used to determine the time of day and date. The determination that a holiday is approaching could trigger a sale price or a price increase. When the holiday is over, the price could be reduced for clearance. These additional considerations can be considered in the same manner as described in FIG. 2. Step 65 illustrates testing for the additional consideration of the time of day [70]. Extra pricing factors H or I are considered in calculating the new Price, depending on whether it is AM or PM or specific ranges of time during the day or night. For example, in the morning, when the shop opens the Price could be set at its nominal starting point ($300.00). In the evening, when shop traffic is slow and it is nearing closing time, the Price could be additionally discounted.

In most retail businesses the shop manager must consider the length of time merchandise has been on the shelves. Clothing for example, can easily go out of style. A large part of the manager's job is therefore to make sure that prices are adjusted in a manner which aids in proper inventory management. Under existing systems, although the bar code can be made to reflect an automatic discount with time, the customer readable price must be changed by hand, or in response to manual commands. The instant invention provides among other things, a method and apparatus for offering items or services for sale which automates the crucial job of transmitting changes in price to the price actually displayed on the electronic tags 10.

FIG. 3 is a flow chart for another embodiment of the invention which allows for the displayed price of items sold in retail shops, both in machine and customer readable form, to be changed automatically in response to the rapid and constant changes in the posted prices on various competitor's prices which are displayed for example, on internet web pages dedicated to allowing on-line shoppers to comparison shop. One such internet site is MYSIMON.COM. This site, allows a browser to enter a specific model number for a product and in response displays lists of vendors and the prices each charge for the item. When a customer chooses a vendor, he/she is automatically "linked" to the vendor's web site to complete the purchase.

A retail shop can be set up to offer merchandise which automatically reflects the prices charged by on-line competitors. FIG. 3 is a flow chart which is a subroutine in accordance with another embodiment of the invention.

The processor 15 can be an IBM compatible computer running the Windows 98 operating system and a web browser, e.g. Netscape or IE. These browsers all allow the user to specify a starting page which is accessed automatically when the network is contacted via modem 30, for example. The computer can therefore easily be programmed to periodically dial into, or otherwise connect to, the internet page featuring competitor's prices, for example MYSIMON.COM. The computer can be programmed by one skilled in the programming art, to input into the browser one or more model numbers corresponding to items which are also for sale in the shop. Prices supplied by the web page, which correspond to these items, can be captured by the browser as text and stored in the computer's memory [100]. The programmer can easily design code to sample the prices of one or more competitors each hour and download these prices, with their corresponding model number(s). Using this information, the computer calculates an average price AP [110]. AP does not have to be an average however. Any mathematical function can be chosen to process the downloaded price vectors to take into consideration other factors charged by on-line vendors, for example shipping charges, packing fees etc.

If the computer determines that AP is equal to Price, then no change is made. If however, Price turns out to be greater or less than AP, then C can be changed to AP, or some other factor (f) of AP, and Price can be set to C [130].

In concert with the pricing mechanisms described above, marketing communications, materials, posters, display art etc. which are also made from indicating material which is responsive to electronic signals, could also be adjusted using the invention. For example, the big sign in the front of a shop could say "All men's clothing 30% off" at the beginning of the day. Then, later on, if the processor, in response to the inventory feedback provided by the bar codes at check out, determines that men's jeans are not selling at all but men's shirts ARE selling, the big sign could be changed to say: "All men's jeans are 50% off and all men's shirts are 20% Off." Automatically while the prices on the individual items are changed accordingly.

Although the invention has been described above with respect to specific external considerations like shop traffic, time, date, internet competition and temperature, it should be understood that the invention and the claims which follow are meant, and should be interpreted to cover any possible environmental condition which could be determined with appropriate sensing devices and processed by the processor to control electronic price tags as described above. The word environmental is defined herein to mean any condition or circumstance which can be detected by a sensor or measuring system, which might be used as a basis to adjust factors relevant to the marketing of goods or services.

The phrase "electronic tag" as used herein is meant to cover any indication device which could be connected to or placed adjacent or nearby to an item which is being offered for sale, rent, etc, and which is controlled from a central or distributed processing system in response to external or internal determination of environmental or other relevant conditions.

While the specific preferred embodiments have been described, they are merely exemplary and those skilled in the art will perceive numerous modifications and variations of the embodiments without departure from the spirit and scope of the invention, as defined by the appended claims and the specification herein.

We claim:

1. A system for determining a selling price for an item for sale comprising:
   a) an electronic tag affixed or proximate to said item for displaying a selling price for said item; and
   b) a processor having an output coupled to said electronic tag and at least one input for accepting environmental data detected by least one environmental monitoring device,
   wherein said processor utilizes said environmental data to determine a second selling price for said item based in response thereto and sets said selling price to said second selling price without a substantial time delay and wherein said at least one environmental monitoring device comprises a sensor for measuring customer activity.

2. A system for determining a selling price for an item for sale comprising:
   a) an electronic tag affixed or proximate to said item for displaying a selling price for said item; and
   b) a processor having an output coupled to said electronic tag and at least one input for accepting environmental data detected by least one environmental monitoring device,
   wherein said processor utilizes said environmental data to determine a second selling price for said item based in response thereto and sets said selling price to said second selling price without a substantial time delay and wherein said at least one environmental monitoring device comprises a sensor for detecting weather.

3. A system for determining a selling price for an-item for sale comprising:
   a) an electronic tag affixed or proximate to said item for displaying a selling price for said item; and
   b) a processor having an output coupled to said electronic tag and at least one input for accepting environmental data detected by least one environmental monitoring device,
   wherein said processor utilizes said environmental data to determine a second selling price for said item based in response thereto and sets said selling price to said second selling price without a substantial time delay and wherein said at least one environmental monitoring device comprises a time of day input from a clock.

4. A system for determining a selling price for an item for sale comprising:
   a) an electronic tag affixed or proximate to said item for displaying a selling price for said item; and
   b) a processor having an output coupled to said electronic tag and at least one input for accepting environmental data detected by least one environmental monitoring device,
   wherein said processor utilizes said environmental data to determine a second selling price for said item based in response thereto and sets said selling price to said second selling price without a substantial time delay and wherein said at least one environmental monitoring device comprises a day of the year input from a calendar.

5. A system for determining a selling price for an item for sale comprising:
   a) an electronic tag affixed or proximate to said item for displaying a selling price for said item; and
   b) a processor having an output coupled to said electronic tag and at least one input for accepting environmental data detected by least one environmental monitoring device,
   wherein said processor utilizes said environmental data to determine a second selling price for said item based in response thereto and sets said selling price to said second selling price without a substantial time delay and wherein said at least one environmental monitoring device comprises a network connection to a source of information about at least a third selling price for said item charged by at least one competitor.

6. A method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said at least one environmental monitoring device comprises a sensor for measuring customer activity.

7. Method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said environmental data comprises the number of customers entering a shop within a given period of time.

8. Method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said environmental data comprises the weather outside of a shop.

9. A method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said environmental data comprises a selected time period of the day.

10. A method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said environmental data comprises a selected day of a week.

11. A method for determining a selling price for an item for sale, said method comprising the steps of:
   a) disposing an electronic tag for displaying a selling price for said item on or proximate to said item;
   b) coupling said electronic tag to an output of a processor; and
   c) coupling said at least one input of said processor to receive environmental data from least one environmental monitoring device, wherein said processor utilizes said environmental data to determine a second selling price for said item in response thereto and sets said selling price to said second selling price without a substantial time delay and wherein said environmental data comprises one or more prices charged by one or more competitors for the same or a similar item.

* * * * *